AUTOMATIC TENSION RELEASE DEVICE

Filed Nov. 29, 1961 2 Sheets-Sheet 1

INVENTOR.
KEVIN P. O'SULLIVAN
BY
Davis, Hoxie, Faithfull & Hapgood
ATTORNEYS.

AUTOMATIC TENSION RELEASE DEVICE

Filed Nov. 29, 1961 2 Sheets-Sheet 2

INVENTOR.
KEVIN P. O'SULLIVAN
BY
Davis, Hoxie, Faithfull & Hapgood
ATTORNEYS.

United States Patent Office 3,109,213

Patented Nov. 5, 1963

3,109,213
AUTOMATIC TENSION RELEASE DEVICE

Kevin P. O'Sullivan, 616 Schneider Court, Westbury, N.Y.

Filed Nov. 29, 1961, Ser. No. 155,688
4 Claims. (Cl. 24—126)

This invention relates to automatic clothesline tensioning devices and in particular to means for automatically releasing the tensioned line when there is danger of breakage due to shrinkage when the line is wet.

There are commercially available one-way tensioning devices through which the free end of a secured line is passed and knotted, while a swivel ring of the tensioning device is secured to a hook embedded in a rigid wall or fixed mooring body. The commercial device is so arranged that when the line stretches or becomes slack for any reason, the user need only pull on the free knotted end until he attains the desired tension and then let go of it, the one-way action of the device preventing retrogression of the line and ultimate slacking. When such a taut line is subjected to the elements of nature and gets wet, there is a tendency for the line to shrink. If this shrinkage is uncontrolled, either the line may break, the hooks may pull out of their securing surfaces or the tensioning device may be damaged.

This danger is overcome by this invention in that a force-generating moisture sensing element is provided in combination with the one-way tensioning device which will cause the device to release the line automatically within a short time after it becomes wet.

It is therefore a feature of my invention to modify known forms of manually operable one-way line tensioning devices by including an additional moisture sensing element so arranged in combination therewith as to exert a force in the proper direction to cause the device to release its grip on the line when both become wet.

In the drawings I illustrate two forms of sensing elements and the method of arranging them to release the tensioned line. In one form an element which expands on absorbing moisture is utilized while in the other form an element which contracts on absorbing moisture is utilized. Of the two forms illustrated herein I prefer the embodiment utilizing the moisture expansive element.

Figure 1:
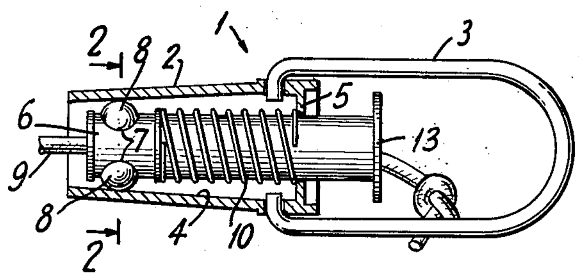
FIG. 1 is a longitudinal sectional view of a known line tension device.
Figure 2:
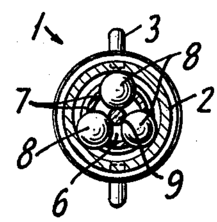
FIG. 2 is a cross-sectional view along line 2—2 of FIG. 1.

In FIG. 1, the known line tensioning device generally indicated at 1 comprises an outer shell or housing 2, and a swivel ring 3 attached thereto. The shell 2 has a tapered inner wall surface 4 and an end-wall member 5. Within the shell is disposed a hollow tubular member 6 having enlarged end portions to prevent its disassembly. The tube 6 has, at its outward end, three holes 7 spaced 120° about its circumference. Within the tube 6 are three balls 8 which extend through the holes 7 and whose outward movement is restricted, at any point, by the inner diameter of the shell 2, and whose inward movement is restricted by tangential contact between the three balls 8. As the tube 6 moves to the right the inner diameter of the shell 2 increases allowing the balls to move outwardly to receive the centrally disposed line 9. A biasing spring 10 normally urges the tube 6 leftwardly within the shell 2 causing the balls 8 to pinch inwardly and squeeze the line 9.

It may readily be seen that if a line 9 were so arranged within the device 1 a leftward tension applied to the line only causes the device to grip it more tightly. While a rightward tension applied to the line, or the tube 6, would cause the device to release its hold on the line 9 and permit the line to pass freely through the tube.

Figure 3:
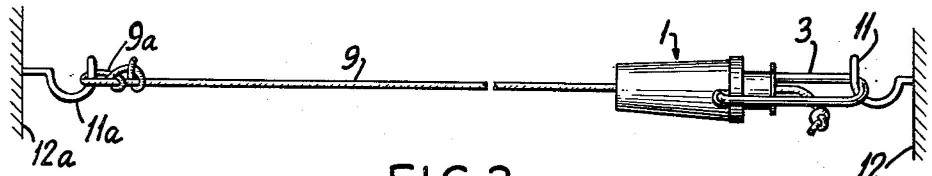
FIG. 3 is a schematic view of the manner in which the commercial device is utilized.

A device of this type is normally utilized in the manner illustrated in FIG. 3, where one end *9a* of the line 9 is secured to a hook *11a* in a wall *12a*. The swivel ring 3 may then be remotely attached to a second hook 11 attached to a mooring body 12, or linked thereto by an additional piece of line, as illustrated in FIG. 4.

Figure 4:
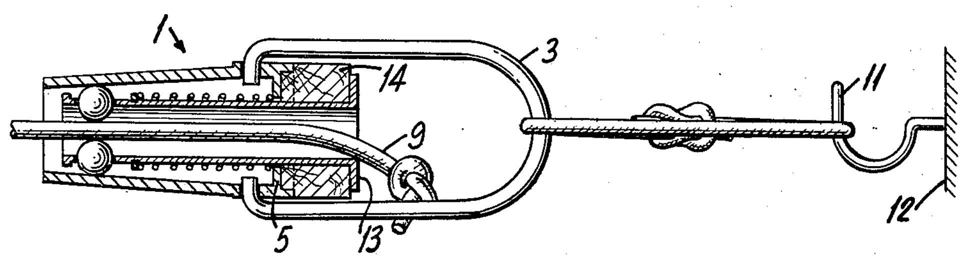
FIG. 4 is a cross-sectional view of the device illustrating the preferred modification to include a moisture-expansive release element.

FIG. 4 illustrates the preferred embodiment of my invention which includes a moisture-expansive element 14. This annular element 14 is disposed between the end 5 of the shell 2 and the flanged end 13 of the tube 6. The annular member 14 may be fabricated from any material which will expand, on absorbing moisture, in the axial direction. I have found wood to be a material which will expand axially when its grain structure is arranged to be oriented transversely to the axis of the desired movement. Thus, in FIG. 4, the grain of the wood is directed perpendicular to the surface of the paper rather than parallel to it. I have found that an annular piece of poplar wood, arranged in that fashion, will expand approximately 10 percent. A one inch length expanding nearly one tenth of an inch is sufficient to release the grip of the balls 8 on the line 9. I have also determined that the poplar-wood moisture-expansive element will revert to its normal length within a period of ten to twelve hours after the rain has ceased and drying commences. Axial expansion of the member 14 will cause a rightward movement of the tube 13, with respect to the body 2, releasing the line 9. The length of the expansive element 14 will have to be determined for a given device 1 and a given diameter of the line 9 since its length will affect the neutral, or contracted, position of the sliding tubular member 13. This requirement would be eliminated where the device 1 were provided with a longitudinally adjustable element to act in place of the fixed seat 5 against which the expansive element operates. A threaded tube, not illustrated, that could be screwed into corresponding threads cut into either the inner or outer surface of the tubular member 2 would provide an adjustable stop for adjusting the release mechanism to operate with any size rope or line.

Figure 5:
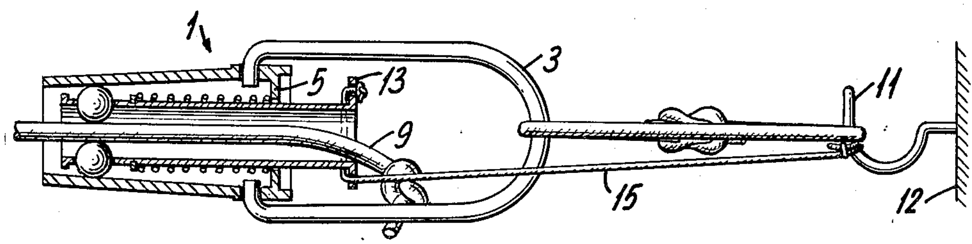
FIG. 5 illustrates the second form of the invention which includes a moisture-contractive release element.

FIG. 5 illustrates a second form of the invention wherein a moisture-contractive element 15, in the form of a piece of cord, which may be of the type used in the manufacture of Venetian blinds, is secured tautly between the flange 13 of the tube 6 and a stationary wall 12 or hook 11 in parallel to the swivel hook 3 connection to the same surface. The only mechanical property controlling the selection of the cord 15 is that it must contract, when wet, at a faster rate than the main line 9. If the element 15 were not so selected and it contracted more slowly than the line 9, the balance of forces would tend to tighten the release mechanism rather than loosen it. However, when the moisture-contractive element 15 shrinks at a faster rate than main line 9, the mechanism releases the line 9 automatically to prevent its breakage.

Figure 6:
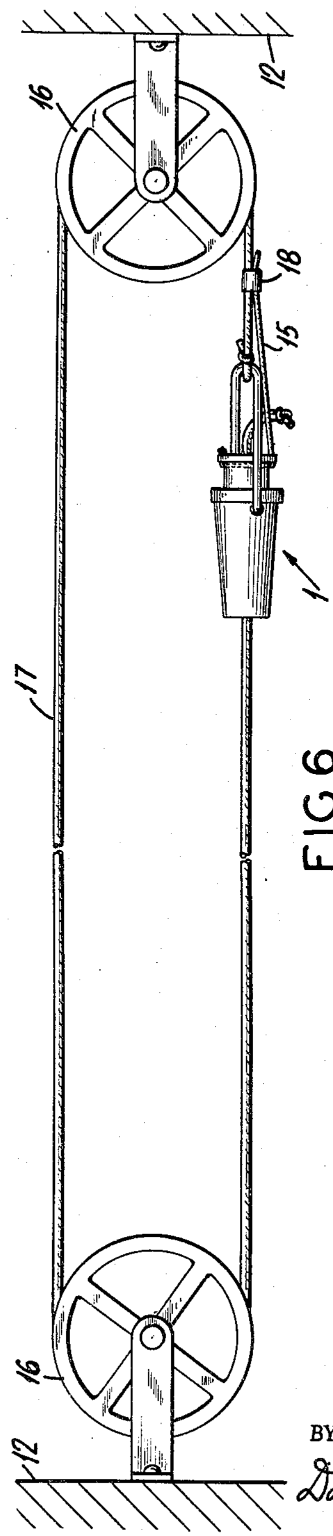
FIG. 6 illustrates an alternative arrangement wherein the automatic tension release device is utilized in a rotatable wash line system.

FIG. 6 illustrates a further embodiment of the automatic release device shown in FIG. 5 as utilized in a rotating wash line system. In this configuration pulleys 16, secured to mooring surfaces 12, support a rotating washline 17 in the ordinary manner. The automatic tensioning device 1, and the moisture-contractive release element 15 of FIG. 5, are connected in series with the line 17. In this embodiment, the remote end of the release element or trigger cord 15 may be attached securely to the main or principal line 17, as by a crimped metal lug 18, or in any other suitable manner. The arrangement of FIG. 6 could as well employ the FIG. 4 form of release element 14 in which event no trigger cord connection to the line 17 would be necessary.

It is understood that any other moisture-expansive or contractive materials, other than wood and cord, may be utilized in carrying out the invention and that these materials are merely illustrative examples of the preferred embodiments of the invention.

I claim:

1. In combination with a one-way rope tensioning device of the type having a stationary cone-shaped outer body member adapted to be secured to a fixed mooring body and a spring biased displaceable flanged hollow tubular rope gripping member through which a rope is adapted to pass freely in only one direction until said gripping member is displaced in the direction of free rope movement whereupon the rope may move freely in either direction, a moisture-activated member adapted to change length when subjected to increased moisture connected in part to the spring biased tubular gripping member and in part to a fixed surface whereby an increase in moisture of the moisture-activated member will move the tubular gripping member in the direction of free rope movement.

2. The combination as in claim 1 wherein the moisture-activated force-generating member is a piece of moisture-contractive material disposed between said displaceable gripping member and said fixed mooring body.

3. The combination as in claim 1 wherein the moisture-activated force-generating member is a block of moisture-expansive material disposed between the stationary outer-body member and the flange portion of the displaceable gripping member.

4. The combination as described in claim 3 wherein the moisture-expansive material is wood.

References Cited in the file of this patent

UNITED STATES PATENTS

| | | |
|---|---|---|
| 1,348,131 | Huey | July 27, 1920 |
| 1,628,235 | De Meo | May 10, 1927 |
| 1,705,167 | Yannetta | Mar. 12, 1929 |
| 1,781,153 | Allen | Nov. 11, 1930 |
| 2,010,040 | Shurtleff | Aug. 6, 1935 |

FOREIGN PATENTS

| | | |
|---|---|---|
| 300,793 | Italy | Sept. 19, 1932 |
| 196,185 | Austria | Feb. 25, 1958 |